(12) United States Patent
Kimura et al.

(10) Patent No.: US 6,487,074 B1
(45) Date of Patent: Nov. 26, 2002

(54) COOLING SYSTEM FOR ELECTRONIC DEVICE

(75) Inventors: Naoki Kimura, Tokyo (JP); Jun Niekawa, Tokyo (JP); Hiroaki Maekawa, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/921,796

(22) Filed: Aug. 2, 2001

(51) Int. Cl.[7] .................................................. H05K 7/20
(52) U.S. Cl. ...................... 361/695; 165/80.3; 312/236; 454/184
(58) Field of Search ................................ 361/687, 690, 361/694, 695, 697, 704, 707–711, 717–719; 454/184; 165/121–126, 80.3, 185; 312/236

(56) References Cited

U.S. PATENT DOCUMENTS

| | | | | |
|---|---|---|---|---|
| 5,339,214 A | * | 8/1994 | Nelson | 361/695 |
| 5,414,591 A | * | 5/1995 | Kimura et al. | 361/695 |
| 5,813,243 A | * | 9/1998 | Johnson et al. | 62/259.2 |
| 5,875,965 A | * | 3/1999 | Lee | 236/44 C |
| 5,934,368 A | * | 8/1999 | Tanaka et al. | 165/233 |
| 6,011,689 A | * | 1/2000 | Wrycraft | 361/695 |
| 6,094,347 A | * | 7/2000 | Bhatia | 361/695 |
| 6,141,214 A | * | 10/2000 | Ahn | 361/687 |
| 6,278,607 B1 | * | 8/2001 | Moore et al. | 361/687 |

FOREIGN PATENT DOCUMENTS

JP         2000-277957         10/2000

* cited by examiner

Primary Examiner—Gerald Tolin
(74) Attorney, Agent, or Firm—Knobbe, Martens, Olson & Bear LLP

(57) ABSTRACT

A cooling system for an electronic device including a heat generating component within a case, wherein the heat generating component is installed on a bottom plate of the case, the bottom plate has a ventilating hole for air passage formed therein, and a foot portion installed outer surface of the case for maintaining a prescribed vertically opened space below the lower surface of the case.

9 Claims, 5 Drawing Sheets

COOLING SYSTEM FOR ELECTRONIC DEVICE

FIELD OF THE INVENTION

The present invention relates to a cooling system for electronic devices such as a note-type personal computer, a desk top-type computer or the like.

RELATED ART

In general, various cooling systems have been introduced to cool heat generated from heat generating components such as a CUP or the like in electronic devices.

FIG. 5 is a schematic cross-sectional view of a conventional cooling system for electronic devices. As shown in FIG. 5, the conventional cooling system for electronic devices includes a heat pipe 52 thermally connected to a heat generating component 51 such as a CPU or the like installed within a case 50, and a heat sink having pin-type fin 53 which is thermally connected to the heat pipe 52. A fan 56 is attached to the heat sink 54 in the vicinity of outlet port 55 of the case 50.

According to the conventional cooling system for electronic devices, the heat generated from the heat generating component 51 is transferred through the heat pipe 52 to the heat sink 54, and then, exhaled through the outlet port 55 by means of the rotation of the fan 56.

SUMMARY OF THE INVENTION

The present invention relates to a cooling system for an electronic device in which a highly cooling effect can be obtained even if the space within the case is small. One embodiment of a cooling system for an electronic device of the present invention comprises a cooling system for an electronic device including a heat generating component within a case, wherein said heat generating component is installed on a bottom plate of said case, said bottom plate is made of a heat transfer material with a ventilating hole for air passage formed therein, and a foot portion installed outer surface of said case for maintaining a prescribed vertically opened space below the lower surface of the case.

DETAILED DESCRIPTION OF THE PREFERRED EMBODIMENTS

Embodiments of the cooling system for an electronic device of the present invention are described with reference to the drawings. The cooling system for an electronic device of the present invention is applicable to various kinds of electronic device, for example, such as note-type personal computer, desk top-type computer or the like.

One embodiment of a cooling system for an electronic device of the present invention comprises a cooling system for an electronic device including a heat generating component within a case, wherein said heat generating component is installed on a bottom plate of said case, said bottom plate is made of a heat transfer material with a ventilating hole for air passage formed therein, and a foot portion installed outer surface of said case for maintaining a prescribed vertically opened space below the lower surface of the case.

Figure 1A:
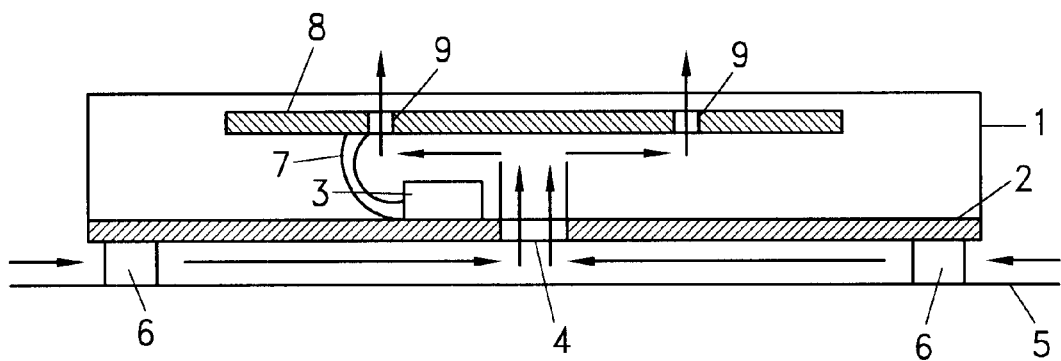
FIG. 1(A) is a schematic cross-sectional view of one embodiment of the cooling system for an electronic device of the present invention.

FIG. 1(A) is a schematic cross-sectional view of one embodiment of the cooling system for an electronic device of the present invention. As shown in FIG. 1(A), a bottom plate 2 of the case 1 is made of a heat transfer material member having a heat conductivity of at least 10 W/mk (preferably at least 40 W/mk), for example, material member of aluminum, copper, magnesium or alloy including at lease one thereof. A heat generating component 3 is mounted on the bottom plate 2 so that the bottom plate 2 is thermally contacted with the heat generating component 3. In addition, a ventilating hole 4 for air passage is formed in about center portion of the bottom plate 2. Furthermore, a foot portion 6 is provided outside the case on respective outer end portions of the bottom plate so that a prescribed vertically opened space is maintained below the lower surface of the case between a floor surface 5. The foot portion may comprises a foot portion in which the height of the foot portion can be adjusted.

Furthermore, in the cooling system for an electronic device of the present invention, a heat dissipating plate may be further installed within the case. The heat dissipating plate is thermally connected through a heat transfer material member to the heat generating component, and the heat dissipating plate is installed at a position where air introduced through the ventilating hole in the bottom plate hits.

More specifically, as shown in FIG. 1, a heat dissipating plate 8 made of aluminum or the like is installed in an upper portion within the case 1, which is thermally connected through a heat transfer material member 7 to a heat generating component 3. The heat dissipating plate 8 is installed at a position where air introduced into the case through the ventilating hole 4 in the bottom plate 2 hits.

At least one exhale port is formed in the heat dissipating plate 8 for exhaling the air that is introduced into the case 1 through the ventilating hole 4 of the bottom plate 2 of the case 1.

According to the above-mentioned embodiment of the invention, the bottom plate 2 of the case functions as a heat dissipating fin so that the heat generated from the heat generating component 3 is widely spread through the bottom plate 2 and dissipated, and in addition, transferred through the heat transfer material member 7 to the heat dissipating plate 8. Furthermore, cool air introduced from the lower side of the bottom plate 2 is introduced through the ventilating hole 4 into the case 1, and hits the heat dissipating plate 8 so as to cool the heat dissipating plate 8, thus improving a cooling effect. Furthermore, the cool air introduced into the case 1 is exhaled out of the case through the exhale ports 9 of the heat dissipating plate 8 together with the heat generated from the heat generating component 3.

The inventor of the present invention carried out the experiment for investigating a capable power consumption of the CPU without being over heated with the use of the bottom plate 2 having surface area of 600 square cm and under the condition where the distance between the bottom plate 2 and the floor surface 5 is 2 mm. The result of the experiment shows that the power consumption of the CPU without using the cooling system of the embodiment shown in FIG. 1(A) of the present invention was 16 w, while the power consumption of the CPU with the use of the cooling system of the above-mentioned embodiment of the present invention was increased to 22 w. Accordingly, by using the cooling system of the embodiment shown in FIG. 1(A) of the present invention, clock speed is raised higher than the conventional one without causing overheating to increase the power consumption of the CPU, thus enabling to extract higher performance of the CPU.

Another embodiment of a cooling system for an electronic device of the present invention comprises a cooling system for an electronic device including a heat generating component within a case, wherein the heat generating component is installed on a bottom plate of the case, the bottom plate is made of a heat transfer material with a ventilating hole for air passage formed therein, a foot portion installed outer surface of the case for maintaining a prescribed vertically opened space below the lower surface of the case, and a heat dissipating plate is further installed within the case, the heat dissipating plate is thermally connected through a heat transfer material member to the heat generating component, the heat dissipating plate being installed at a position where air introduced through tie ventilating hole in the bottom plate hits.

In the cooling system of the invention, a fan may be further installed on the ventilating hole in the case.

Figure 1B:
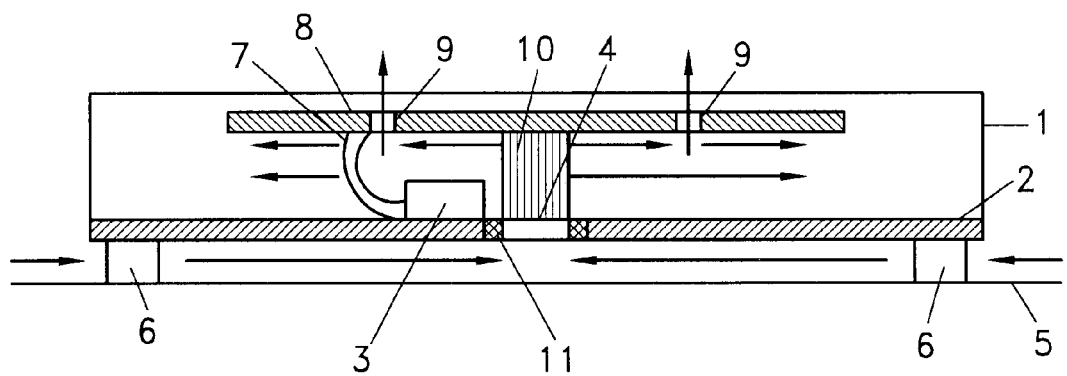
FIG. 1(B) is a schematic cross-sectional view of other embodiment of the cooling system for an electronic device of the present invention.

FIG. 1(B) is a schematic cross-sectional view of other embodiment of the cooling system for an electronic device of the present invention. The embodiment as shown in FIG. 1(A) is a cooling system in which the inside of the case receiving the heat generating component is cooled by an outside air per se. This embodiment is a cooling system in which the inside of the case receiving the heat generating component is cooled by forced air cooling using a fan 10.

As shown in FIG. 1(B), in this embodiment, a fan 10 is installed on the ventilating hole 4 in the bottom plate 2. An O-ring 11 is installed along the outer peripheral of the ventilating hole 4 to prevent air from leaking therethrough.

According to this embodiment, a cool air introduced from the lower side of the bottom plate 2 is inhaled into the case 1 by a fan 10 through the ventilating hole 4, and moved from the center portion of the case 1 to outer peripheral portion of the case within the case, thus enhancing the cooling efficiency.

The inventor of the present invention carried out the experiment for investigating a capable power consumption of the CPU without being over heated with the use of the bottom plate 2 having surface area of 600 square cm and under the condition where the distance between the bottom plate 2 and the floor surface 5 is 2 mm. The result of the experiment shows that the power consumption of the CPU with the use of the cooling system of the embodiment as shown in FIG. 1(B) without the heat dissipating plate 8 of the present invention was increased to 42 w, and with the use of the heat dissipating plate 8 was increased to 66 w. In this embodiment, the heat dissipating plate 8 may be used but not necessarily used. When the heat dissipating plate 8 is used, any material member can be selected as the bottom plate 2.

Figure 2A:
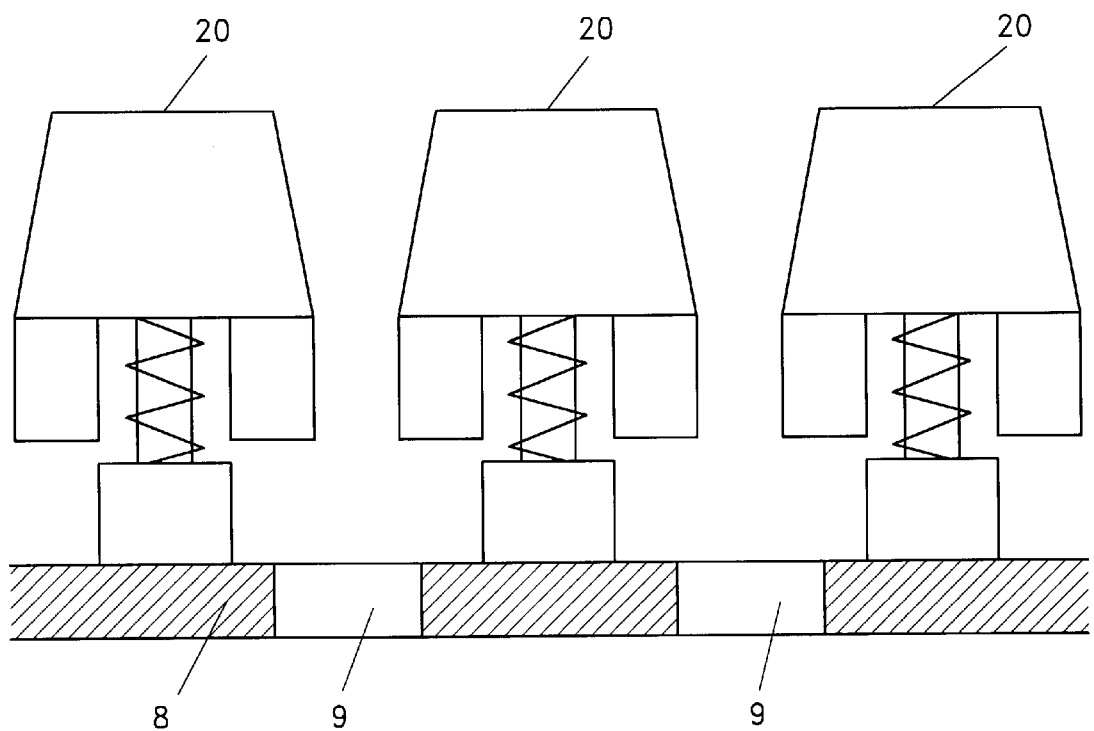
FIG. 2(A) is a schematic cross-sectional view of one embodiment of a heat dissipating plate of the invention.

FIG. 2(A) is a schematic cross-sectional view of one embodiment of a heat dissipating plate of the invention. The heat dissipating plate 8 may be a supporting plate for supporting a lower portion of a key top 20 of a key board, as shown in FIG. 2(A).

Figure 2B:
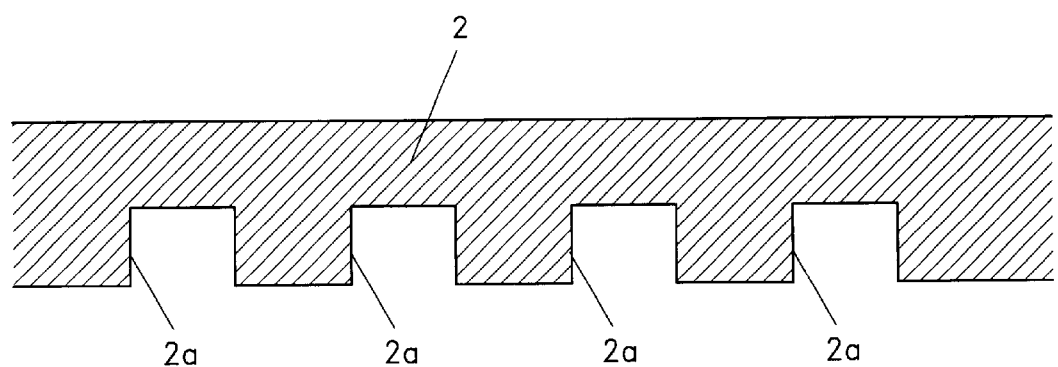
FIG. 2(B) is a schematic cross-sectional view of one embodiment of a bottom plate of the case of the invention.

FIG. 2(B) is a schematic cross-sectional view of one embodiment of a bottom plate of the case of the invention. As shown in FIG. 2(B), grooves 2a may be formed on the lower surface of the bottom plate 2. When the grooves 2a are formed on the lower surface of the bottom plate 2, the surface area of the bottom plate 2 is enlarged to more effectively function as the heat dissipating fin.

The inventor of the present invention carried out the experiment for investigating a capable power consumption of the CPU in the same manner as described above. The result of the experiment shows that the power consumption of the CPU with the use of the cooling system of the embodiment as shown in FIG. 1(B) of the present invention without the heat dissipating plate 8 and with grooves 2a formed on the lower surface of the bottom plate 2, which enlarged the surface area of the lower surface of the bottom plate 2 to 1300 square cm, was increased to 45 w.

Another embodiment of a cooling system for an electronic device of the present invention comprises a cooling system for an electronic device including a heat generating component within a case, wherein the heat generating component is installed on a side plate of the case, the side plate is made of a heat transfer material with a ventilating hole for air passage formed therein, and an air guiding plate for guiding an outside air through said ventilating hole is installed in such manner as to cover the ventilating hole with a prescribed space apart therefrom.

FIG. 3 is a schematic cross-sectional view of other embodiment of the cooling system for an electronic device of the present invention. This embodiment is in particular applied to a vertically placed desk top-type personal computer or the like.

Figure 3A:
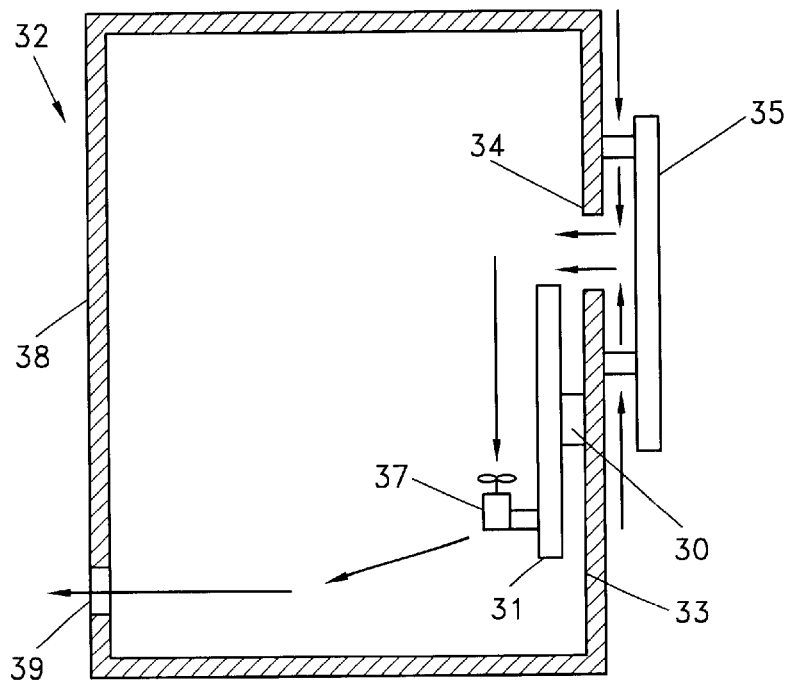
FIG. 3(A) is a schematic cross-sectional view of other embodiment of the cooling system for an electronic device of the present invention.

As shown in FIG. 3(A), in this embodiment, the heat generating component 30 is attached on one surface of the printed circuit board 31, and in addition, is thermally connected to the side plate 33 of the case 32. The side plate 33 of the case 32 is made of a heat transfer material member having a heat conductivity of at least 10 W/mk (preferably at least 40 W/mk), for example, material member of aluminum, copper, magnesium or alloy including at lease one thereof. A ventilating hole 34 for air passage is formed in the side plate 33 of the case 32. An air guiding plate for guiding an outside air through the ventilating hole 34 is installed in such manner as to cover the ventilating hole 34 with a prescribed space apart from the ventilating hole.

On the other surface of the printed circuit board 31 to which the heat generating component is not connected, a fan 37 is attached. An exhale port 39 is formed in the other side plate 38 which faces the side plate 33 for exhaling air introduced into the case by the fan 37 out of the case 1. The plate members of the case 32 other than the side plate 33 may be made of the heat transfer material member.

According to the above-mentioned embodiment of the invention, the side plate 33 of the case 32 functions as a heat dissipating fin so that the heat generated from the heat generating component 3) is. widely spread through the side plate 33 and dissipated. Furthermore, cool air introduced from the gap between the air guiding plate 35 and the side plate 33 is introduced through the ventilating hole 34 into the case 32, and hits the heat generating component 30, the printed circuit board and side plate in the vicinity of the ventilating hole 34 so as to cool the heat generated from the heat generating component 30. Furthermore, the air introduced into the case 1 and cooling the heat within the case is exhaled out of the case through the exhale ports 39 of the side plate of the case.

In addition, in the cooling system for an electronic device of the invention, an air guiding plate moving means for changing said prescribed space may be installed in the air guiding plate. The above-mentioned air guiding plate moving means comprises a connecting link and a pin for pivotably connecting the air guiding plate and the side plate of the case.

Figure 3B:
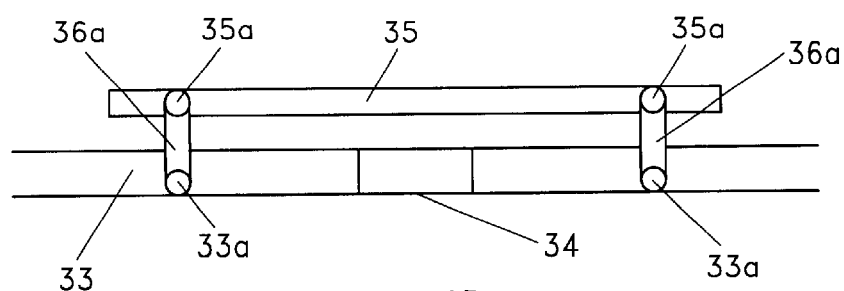
FIG. 3(B) is a schematic cross-sectional view of an outside air guiding plate attached to the case of the invention.
Figure 3C:
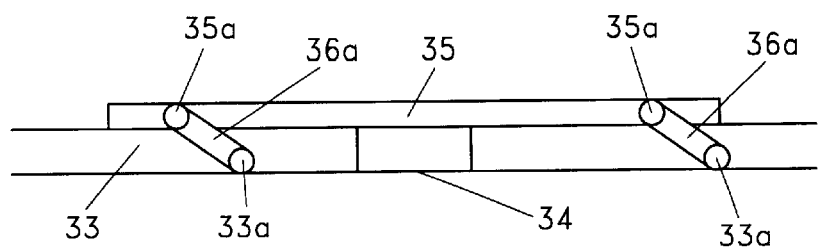
FIG. 3(C) is a schematic cross-sectional view of an outside air guiding plate attached to the case of the invention.

FIG. 3(A) and FIG. 3(B) are schematic cross-sectional view of other embodiment of the cooling system for an electronic device of the present invention In this embodiment, by means of the pin 35a fixed in the air guiding plate 35, the pin 33a fixed in the side plate 33, and the connecting link 36a, the air guiding plate is pivotably connected to the side plate. Since the air guiding plate 35 may pivots on the pin 33a fixed in the side plate 33 of the case 32, the air guiding plate is placed in a state in which the air guiding plate is apart from the side plate 33 of the case 32(refer to FIG. 3(B)), when an outside air is introduced into the case. The air guiding plate 35 may be placed in a state in which the air guiding plate contacts the side plate 33 of the case 32(refer to FIG. 3(C)). In this case, since the air guiding plate 35 contacts the side plate 33 and closes the ventilating hole. As a result, dust can be prevented from intruding into the case 32.

Alternatively, the air guiding plate 35 may be made of the material member which is variable in configuration according to the change of the temperature. According to the above-mentioned air guiding plate 35, when the temperature within the case 32 reaches at least a prescribed temperature, the air guiding plate 35 changes in configuration in such manner that outside air is introduced into the case through the ventilating hole 34.

Other embodiment of a cooling system for an electronic device of the present invention comprises a cooling system for an electronic device including a heat generating component within a case with at least one port for air passage formed therein, and a cooling fan for inhaling air into said case and exhaling air out of said case, wherein a switching means for switching between an inhaling operation and an exhaling operation by changing a rotational direction of said cooling fan.

Figure 4A:
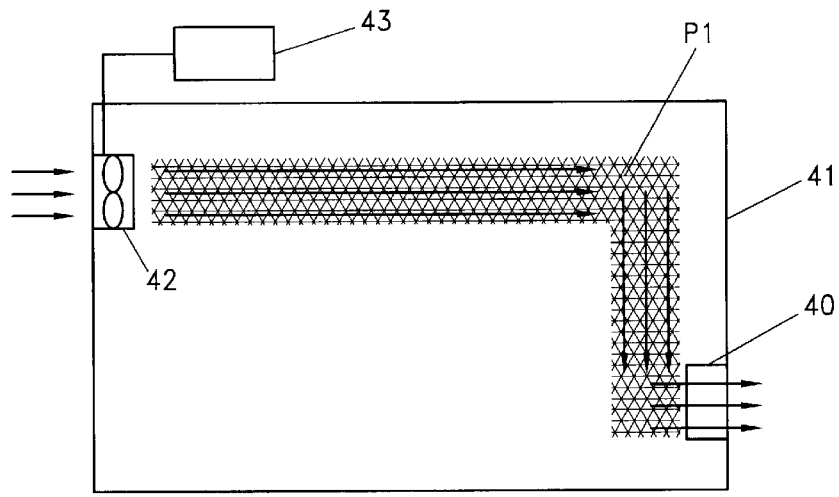
FIG. 4(A) is a schematic cross-sectional view of other embodiment of the cooling system for an electronic device of the present invention.
Figure 4B:
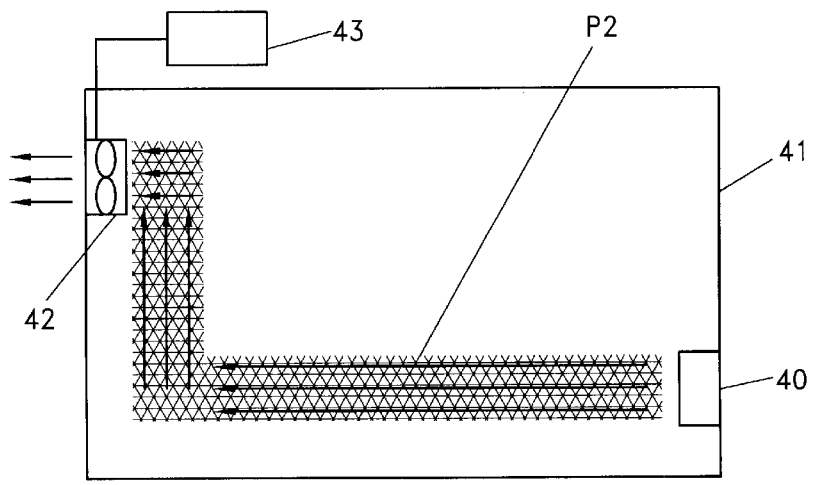
FIG. 4(B) is a schematic cross-sectional view of other embodiment of the cooling system for an electronic device of the present invention.
Figure 4C:
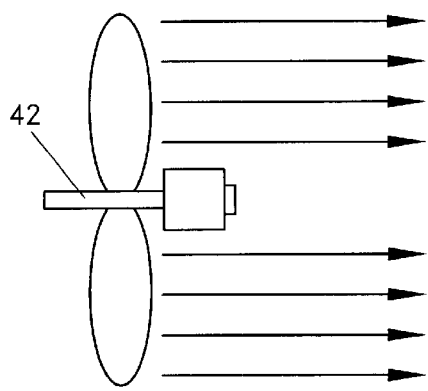
FIG. 4(C) is a schematic view illustrating a cooling fan and air flow.
Figure 4D:
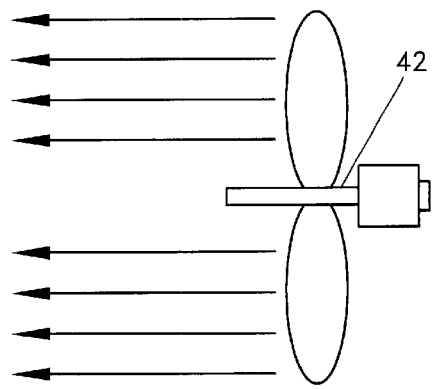
FIG. 4(D) is a schematic view illustrating a cooling fan and air flow.
Figure 5:
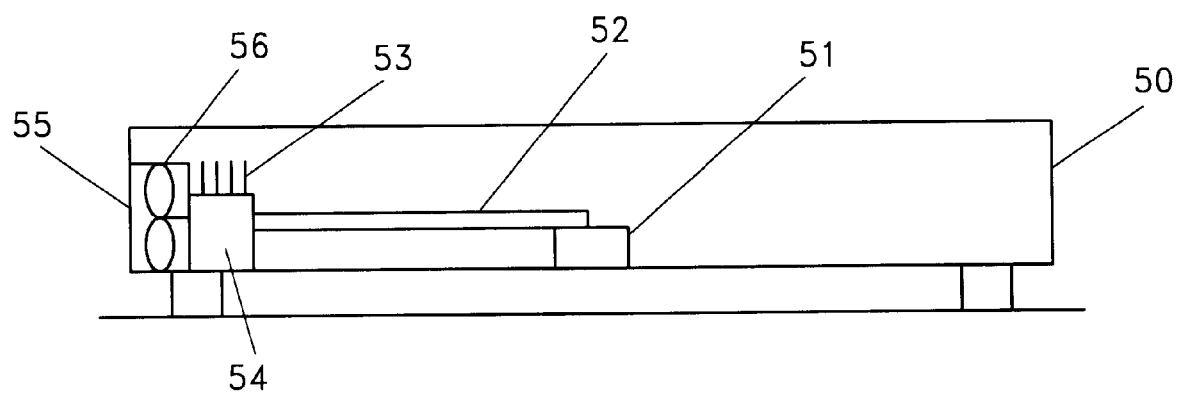
FIG. 5 is a schematic cross-sectional view of a conventional cooling system for electronic devices.

FIG. 4 is a schematic cross-sectional view of other embodiment of the cooling system for an electronic device of the present invention As shown in FIGS. 4(A) and 4(B), in this embodiment, a port 40 for air passage is formed in the case 41. In addition, a cooling fan for inhaling air into the case or exhaling air out of the case 1 is installed in this embodiment.

The cooling fan 42 and the port 40 for air passage are positioned so as to be asymmetrical, as shown in FIG. 4. More specifically, for example, the cooling fan 42 is installed in the upper portion of the side plate of the case 41, whereas the port 40 for air passage is formed in the lower portion of the side plate of the case 41. In addition, a switching portion 43 is installed for switching inhaling operation and exhaling operation of the cooling fan 42 by means of changing rotational direction of the cooling fan 42. The air flows are shown in FIG. 4(C) and FIG. 4(D) respectively, in the case that the cooling fan 42 inhales the air, and in the case that the cooling fan 42 exhales the air. Accordingly, when the outside air is inhaled into the case 41 by the cooling fan 42, the air passage route in which the inhaled air moves in the case 41 is shown in FIG. 4(A) and P1 (refer to FIG. 4(A)). On the other hand, when the air within the case is exhaled out of the case 41 by the cooling fan 42, the air passage route in which the air moves in the case 41 is shown in FIG. 4(B) as P2 (refer to FIG. 4(B)).

By switching between the inhaling operation and the exhaling operation of the cooling fan 42 in every specific time interval (for example every 30 seconds) by means of the switching portion 43, the whole inside of the case 41 can be cooled by a single cooling fan 42. As a result, there is no need to install a plurality of cooling fans in the case, thus enabling to lower cost of the cooling system.

A plurality of temperature sensors may be installed within the case 41, and the switching of the operations of the cooling fan may be controlled by inputting signals detected by the temperature sensors to the switching portion 43. According to the above system, portions in which the temperatures are raised at least the prescribed temperature are selectively and intensively cooled. A partition may be installed in the prescribed portion within the case 41 to control air flow within the case 41.

Lately, the heat generating component comprises a highly integrated elements and highly increases its performance. Together with this, the amount of the heat generated by the heat generating component highly increases. On the other hand, the scale of the electronic device becomes smaller, thus the space within the case becomes narrower. Accordingly, in the conventional cooling system for electronic devices, area of the fin in the heat sink have to be cut small, and therefore it is impossible to perform a sufficient cooling effect. For example, in the case of the A4 size note type personal computer, the available area of the fin in the heat sink is within a range from 80 to 200 square cm, thus, the heat resistance between the fin and air becomes higher to result in higher total heat resistance.

According to the present invention, the above-mentioned conventional problem can be overcome, and a cooling system for an electronic device, in which a highly cooling effect is obtained even if the space within the case is small, can be provided.

The present invention is not limited to the embodiments described above, but various modification may be made within a range of the technical matters described in claims.

According to the present invention, since the bottom plate of the case is made of the heat transfer material member, and the bottom plate can be used as heat dissipating fin, higher heat dissipating effect can be obtained together with realizing small space. In addition, since cool air is introduced into the case through the ventilating hole from the lower side of the bottom plate, the cooling effect can be improved.

Furthermore, according to the present invention, a heat dissipating plate connected through heat transfer material member to the heat generating component is cooled by the cool air introduced into the case through the ventilating hole,the cooling effect can be improved.

In addition, according to the present invention, since the cool air introduced through the ventilating hole from the lower side of the bottom plate is moved within the case by the fan, the cooling effect can be improved.

In addition, since the side plates of the case are made of the heat transfer material member, and the side plates can be used as heat dissipating fin, higher heat dissipating effect can be obtained together with realizing small space. Furthermore, since the cool air introduced through the ventilating hole passing the gap between the air guiding plate and the side plate is introduced into the case and hits the heat generating component and printed circuit board, thus cooling the heat generated from the heat generating component Furthermore, according to the present invention, by switching the inhaling operation and exhaling operation by means of the switching portion, the whole inside of the case can be effectively cooled. As a result, there is no need to install a plurality of cooling fans, thus enabling lower the cost of the system.

What is claimed is:

1. A cooling system for an electronic device having a heat generating component within a case, the system comprising:

a bottom plate of said case in thermal communication with said heat generating component;

wherein said bottom plate comprises a heat transfer material and functions as a heat dissipating device;

wherein said bottom plate comprises a ventilating hole for air passage; and a foot portion installed on an outer surface of said case for maintaining a prescribed vertically opened space below a lower surface of said case.

2. The cooling system for an electronic device as claimed in claim 1, wherein a heat dissipating plate is further installed within said case, said heat dissipating plate is thermally connected through a heat transfer material member to said heat generating component, and said heat dissipating plate is installed at a position where air introduced through said ventilating hole in the bottom plate hits.

3. The cooling system for an electronic device as claimed in claim 1 or 2, wherein a fan is further installed on said ventilating hole in said case.

4. The cooling system for an electronic device as claimed in claim 1 or 2, wherein a plurality of grooves are formed on a lower surface of said bottom plate.

5. The cooling system for an electronic device as claimed in claim 2, wherein at least one exhale port is formed in said heat dissipating plate.

6. The cooling system for an electronic device as claimed in claim 2 or 5, wherein said heat dissipating plate comprises a supporting plate for supporting a key board.

7. A cooling system for an electronic device having a heat generating component within a case, the system comprising:

a side plate of said case in thermal communication with said heat generating component;

wherein said side plate comprises a heat transfer material and functions as a heat dissipating device;

wherein said side plate comprises a ventilating hole for air passage; and an air guiding plate for guiding an outside air into said ventilating hole when located at a first position, and wherein said guiding plate is configured to cover said ventilating hole when said air guiding plate is located at a second position.

8. The cooling system for an electronic device as claimed in claim 7, wherein an air guiding plate moving means for changing said prescribed space is installed in said air guiding plate.

9. The cooling system for an electronic device as claimed in claim 8, wherein said air guiding plate moving means comprises a connecting link and a pin for pivotably connecting said air guiding plate and said side plate of said case.

* * * * *